US008267408B2

(12) United States Patent
Chen

(10) Patent No.: US 8,267,408 B2

(45) Date of Patent: Sep. 18, 2012

(54) HAND TOOL THAT CAN REPLACE TIPS EASILY AND QUICKLY

(76) Inventor: Chen-Tsung Chen, Jiali Township, Tainan County (TW)

(*) Notice: Subject to any disclaimer, the term of this patent is extended or adjusted under 35 U.S.C. 154(b) by 999 days.

(21) Appl. No.: 12/257,611

(22) Filed: Oct. 24, 2008

(65) Prior Publication Data

US 2010/0101382 A1 Apr. 29, 2010

(51) Int. Cl.
*B23B 31/22* (2006.01)

(52) U.S. Cl. ............ 279/22; 279/75; 279/905; 279/906; 81/438; 81/489; 81/177.85

(58) Field of Classification Search .................... 279/22, 279/30, 75, 905, 906; 81/177.85, 438, 489; *B23B 31/22, 31/107*
See application file for complete search history.

(56) References Cited

U.S. PATENT DOCUMENTS 3,583,715 A * 6/1971 Jahrl ................................ 279/75
3,652,099 A * 3/1972 Bilz ................................ 279/75
3,658,351 A * 4/1972 Benjamin et al. ............... 279/75
3,735,993 A * 5/1973 Seibert ............................ 279/75
5,934,846 A * 8/1999 Ishii .............................. 408/141
6,179,302 B1 * 1/2001 Gauthier et al. ................ 279/75
6,270,085 B1 * 8/2001 Chen et al. ....................... 279/22
6,311,989 B1 * 11/2001 Rosanwo ........................ 279/75
6,325,393 B1 * 12/2001 Chen et al. ...................... 279/22
6,457,916 B2 * 10/2002 Wienhold ...................... 408/240
6,637,755 B2 * 10/2003 Chen et al. ...................... 279/22
6,874,791 B2 * 4/2005 Chen et al. ....................... 279/75
6,920,810 B1 * 7/2005 Thompson et al. ........ 81/177.85
7,195,247 B2 * 3/2007 Shu ................................. 279/75
7,287,449 B2 * 10/2007 Abel et al. .................. 81/177.2

* cited by examiner

*Primary Examiner* — Erics A Gates

(74) *Attorney, Agent, or Firm* — Alan Kamrath; Kamrath IP Lawfirm, PA

(57) ABSTRACT

A hand tool includes handle, a connector mounted on the handle and having an inner wall provided with a mounting hole and a peripheral wall provided with a plurality of positioning holes, a drive member mounted on the connector and having a first end provided with a fixing portion which is detachably mounted in the mounting hole of the connector and has a peripheral wall provided with a fixing groove, a plurality of locking balls movably mounted in the positioning holes of the connector and movable into the fixing groove of the drive member to lock the drive member onto the connector, and a control sleeve movably mounted on the connector and movable to press or release the locking balls. Thus, the drive member can be detached from the connector to facilitate a user replace the drive member.

16 Claims, 6 Drawing Sheets

HAND TOOL THAT CAN REPLACE TIPS EASILY AND QUICKLY

BACKGROUND OF THE INVENTION

1. Field of the Invention

The present invention relates to a hand tool and, more particularly, to a hand tool that is used to detach a workpiece, such as a terminal part and the like.

2. Description of the Related Art

A conventional hand tool comprises a handle and a driving tip mounted on an end portion of the handle. Thus, the driving tip is used to detach a workpiece, such as a terminal part and the like. However, the driving tip is only used to operate a determined terminal part and cannot be used to operate other terminal parts of different shapes, so that a user has to prepare multiple hand tools to provide multiple driving tips for operating terminal parts of different shapes, thereby causing inconvenience to the user.

BRIEF SUMMARY OF THE INVENTION

In accordance with the present invention, there is provided a hand tool, comprising a handle, a connector mounted on the handle and having an inner wall provided with a mounting hole and a peripheral wall provided with a plurality of positioning holes each connected to the mounting hole, a drive member detachably mounted on the connector and having a first end provided with a fixing portion which is detachably mounted in the mounting hole of the connector and has a peripheral wall provided with a fixing groove that is movable to align with the positioning holes of the connector, a plurality of locking balls movably mounted in the positioning holes of the connector and movable into the fixing groove of the drive member to lock the drive member onto the connector, and a control sleeve movably mounted on the connector and movable to press or release the locking balls.

The primary objective of the present invention is to provide a hand tool that can replace tips easily and quickly.

Another objective of the present invention is to provide a hand tool, wherein the drive member can be detached from the connector to facilitate a user replace the drive member.

A further objective of the present invention is to provide a hand tool, wherein when the control sleeve is pulled toward the handle, the drive member is detached from the connector automatically, so that the drive member can be detached from the connector easily and quickly by moving the control sleeve.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
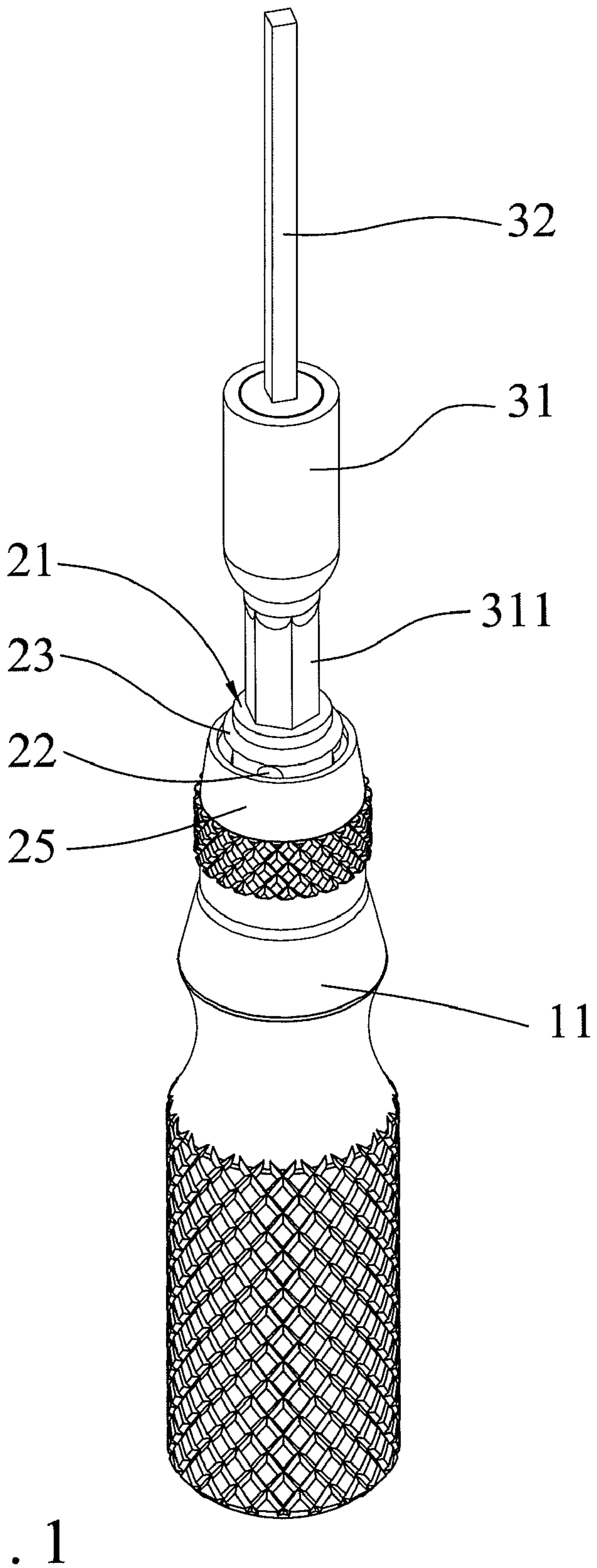
FIG. 1 is a perspective view of a hand tool in accordance with the preferred embodiment of the present invention.
Figure 2:
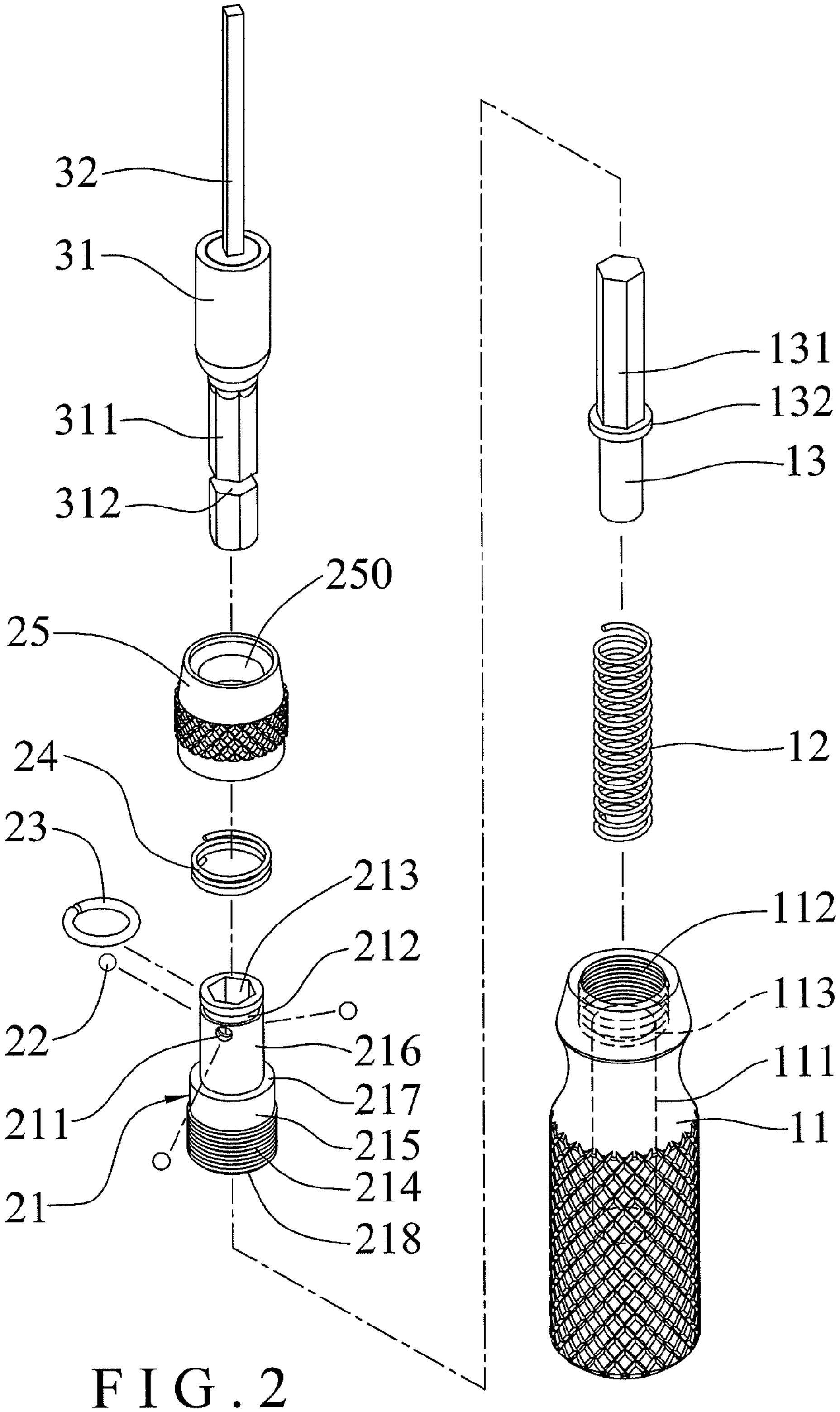
FIG. 2 is an exploded perspective view of the hand tool as shown in FIG. 1.
Figure 3:
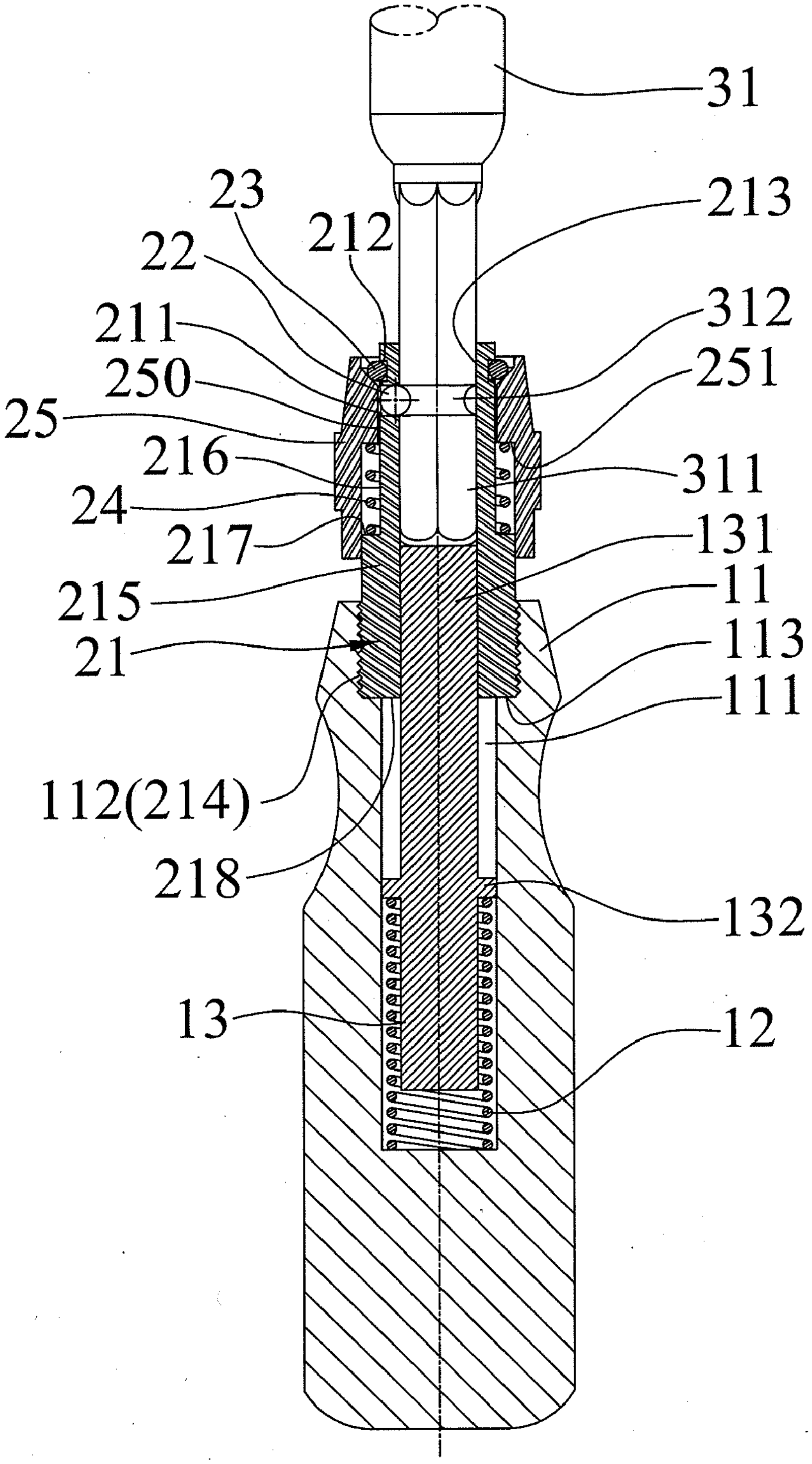
FIG. 3 is a front cross-sectional view of the hand tool as shown in FIG. 1.

Referring to the drawings and initially to FIGS. 1-3, a hand tool in accordance with the preferred embodiment of the present invention comprises a handle 11, a connector 21 mounted on the handle 11 and having an inner wall provided with a mounting hole 213 and a peripheral wall provided with a plurality of positioning holes 211 each connected to the mounting hole 213, a drive member 31 detachably mounted on the connector 21 and having a first end provided with a fixing portion 311 which is detachably mounted in the mounting hole 213 of the connector 21 and has a peripheral wall provided with a fixing groove 312 that is movable to align with the positioning holes 211 of the connector 21, a driving tip 32 removably mounted on a second end of the drive member 31, a plurality of locking balls 22 movably mounted in the positioning holes 211 of the connector 21 and movable into the fixing groove 312 of the drive member 31 to lock the drive member 31 onto the connector 21 a control sleeve 25 movably mounted on the connector 21 and movable to press or release the locking balls 22, an elastic member 24 biased between the connector 21 and the control sleeve 25 to push the control sleeve 25 toward the locking balls 22, a thrust member 13 movably mounted in the handle 11 and having a first end provided with a push portion 131 inserted into the mounting hole 213 of the connector 21 and abutting the fixing portion 311 of the drive member 31, and a restoring member 12 biased between the handle 11 and a second end of the thrust member 13 to push the thrust member 13 toward the drive member 31.

The handle 11 has an inner portion provided with a receiving chamber 111 to receive the thrust member 13 and the restoring member 12. The handle 11 has an open end provided with an inner thread 112 connected to the receiving chamber 111. The inner thread 112 of the handle 11 has a size greater than that of the receiving chamber 111, and the inner portion of the handle 11 is provided with a stepped stop shoulder 113 located between the inner thread 112 and the receiving chamber 111 to stop the connector 21.

The thrust member 13 is movable in the receiving chamber 111 of the handle 11 and has a mediate portion provided with an enlarged resting flange 132. The thrust member 13 has a substantially circular cross-sectional profile. The push portion 131 of the thrust member 13 has a substantially hexagonal cross-sectional profile.

The restoring member 12 is mounted on the thrust member 13 and has a first end abutting the resting flange 132 of the thrust member 13 and a second end abutting a bottom wall of the receiving chamber 111 of the handle 11.

The connector 21 has a first end 215 provided with an outer thread 214 screwed into the inner thread 112 of the handle 11 and a second end 216 having a peripheral wall provided with a retaining groove 212 for mounting a stop ring 23 to stop the control sleeve 25 so that the control sleeve 25 is limited between the stop ring 23 of the connector 21 and the handle 11 to prevent the control sleeve 25 from detaching from the connector 21. The first end 215 of the connector 21 has an end face 218 abutting the stop shoulder 113 of the handle 11. The first end 215 of the connector 21 has a size greater than that of the second end 216 of the connector 21, and the connector 21 has a mediate portion provided with a stepped abutting flange 217 located between the first end 215 and the second end 216 of the connector 21. The mounting hole 213 of the connector

21 has a substantially hexagonal cross-sectional profile and extends through a whole length of the connector 21.

The control sleeve 25 is movable relative to the connector 21 between a first position where the control sleeve 25 presses the locking balls 22 into the fixing groove 312 of the drive member 31 to lock the drive member 31 onto the connector 21 and a second position where the control sleeve 25 is detached from the locking balls 22 to release the locking balls 22 from the fixing groove 312 of the drive member 31 to unlock the drive member 31 from the connector 21. The control sleeve 25 has an inner wall 250 that is movable to press or release the locking balls 22. The inner wall 250 of the control sleeve 25 has a mediate portion provided with a stepped abutting shoulder 251.

The elastic member 24 is mounted on the second end 216 of the connector 21 and has a first end resting on the abutting flange 217 of the connector 21 and a second end resting on the abutting shoulder 251 of the control sleeve 25.

The fixing portion 311 of the drive member 31 has a substantially hexagonal cross-sectional profile. The driving tip 32 is used to detach a workpiece, such as a terminal part and the like.

Figure 4:
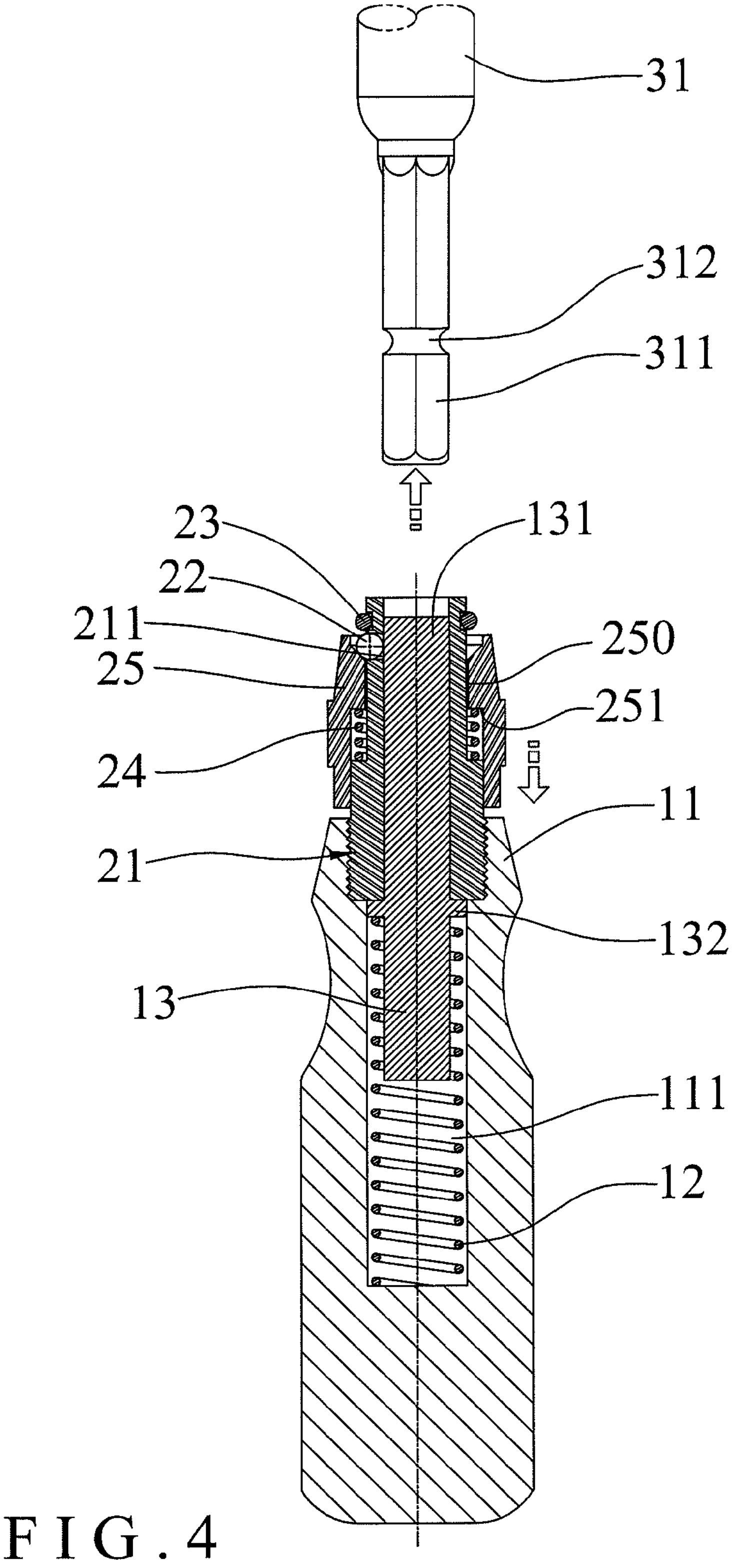
FIG. 4 is a schematic operational view of the hand tool as shown in FIG. 3.

In operation, referring to FIGS. 3 and 4 with reference to FIGS. 1 and 2, when the control sleeve 25 is pulled toward the handle 11 as shown in FIG. 4, the inner wall 250 of the control sleeve 25 is moved to release the locking balls 22, and the thrust member 13 is pushed outwardly by the resorting force of the restoring member 12 to push the fixing portion 311 of the drive member 31 outwardly relative to the connector 21, so that the locking balls 22 are pressed outwardly by the peripheral wall the fixing portion 311 of the drive member 31 to detach from the fixing groove 312 of the drive member 31, and the fixing portion 311 of the drive member 31 is detached from the mounting hole 213 of the connector 21 automatically to facilitate a user replace the drive member 31. At this time, the locking balls 22 are pressed outwardly by the peripheral wall the push portion 131 of the thrust member 13 to partially protrude outwardly from the positioning holes 211 of the connector 21, while the control sleeve 25 is stopped by the locking balls 22 and cannot be returned to the original state.

On the contrary, the fixing portion 311 of the drive member 31 is inserted into the mounting hole 213 of the connector 21 to push the thrust member 13 inwardly. In such a manner, when the fixing groove 312 of the drive member 31 is movable to align with the positioning holes 211 of the connector 21, the control sleeve 25 is pushed by the restoring force of the elastic member 24 to press the locking balls 22, so that the locking balls 22 are pressed by the inner wall 250 of the control sleeve 25 to move into the fixing groove 312 of the drive member 31 so as to lock the drive member 31 onto the connector 21.

Figure 5:
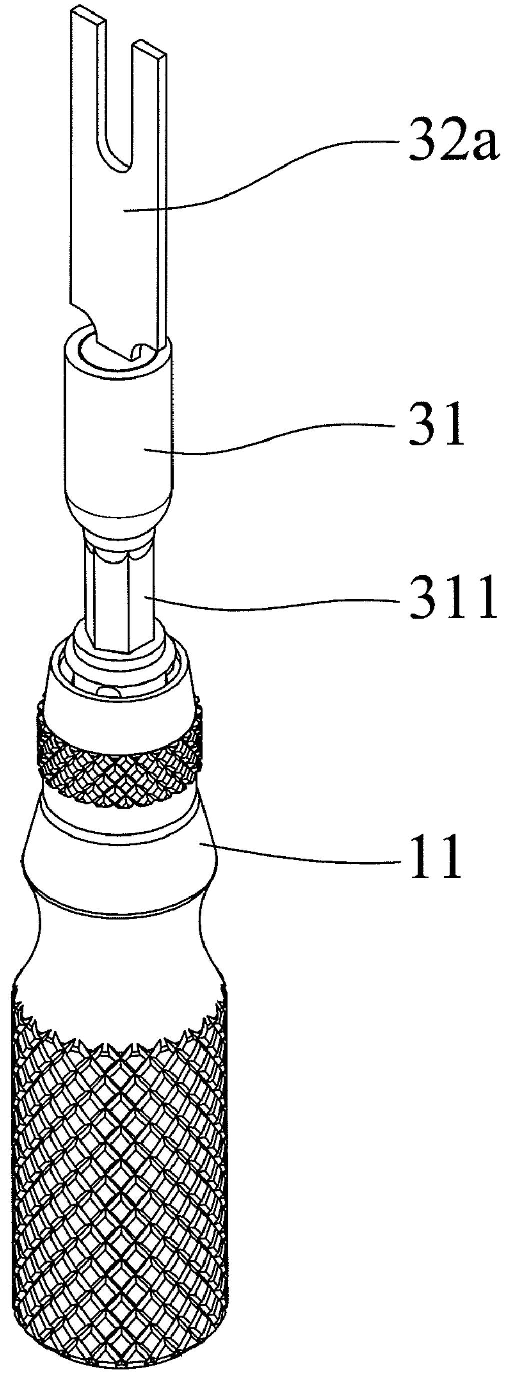
FIG. 5 is a perspective view of a hand tool in accordance with another preferred embodiment of the present invention.
Figure 6:
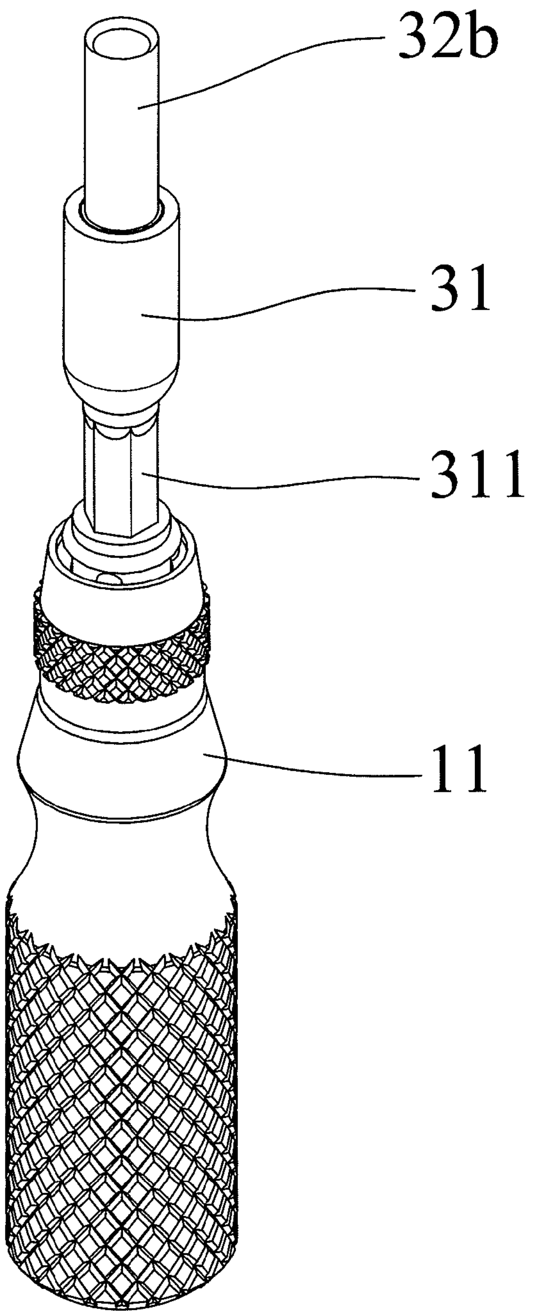
FIG. 6 is a perspective view of a hand tool in accordance with another preferred embodiment of the present invention.

As shown in FIGS. 1, 5 and 6, the driving tips 32, 32a and 32b have different shapes.

Accordingly, the drive member 31 can be detached from the connector 21 to facilitate a user replace the drive member 31. In addition, when the control sleeve 25 is pulled toward the handle 11, the drive member 31 is detached from the connector 21 automatically, so that the drive member 31 can be detached from the connector 21 easily and quickly by moving the control sleeve 25.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hand tool comprising:

a handle;

a connector mounted on the handle and having an inner wall provided with a mounting hole and a peripheral wall provided with a plurality of positioning holes each connected to the mounting hole;

a drive member detachably mounted on the connector and having a first end provided with a fixing portion which is detachably mounted in the mounting hole of the connector and having a peripheral wall provided with a fixing groove that is movable to align with the plurality of positioning holes of the connector;

a plurality of locking balls movably mounted in the plurality of positioning holes of the connector and movable into the fixing groove of the drive member to lock the drive member onto the connector;

a control sleeve movably mounted on the connector and movable to press or release the plurality of locking balls;

a thrust member movably mounted in the handle and having a first end provided with a push portion inserted into the mounting hole of the connector and abutting the fixing portion of the drive member; and a restoring member biased between the handle and a second end of the thrust member to push the thrust member toward the drive member, wherein:

the handle has an inner portion provided with a receiving chamber to receive the thrust member and the restoring member;

the handle has an open end provided with an inner thread connected to the receiving chamber;

the connector has a first end provided with an outer thread screwed into the inner thread of the handle; and the inner portion of the handle is provided with a stepped stop shoulder located between the inner thread and the receiving chamber to stop the connector.

2. The hand tool of claim 1, wherein the connector has a second end having a peripheral wall provided with a retaining groove for mounting a stop ring to stop the control sleeve.

3. The hand tool of claim 2, further comprising:

an elastic member biased between the connector and the control sleeve to push the control sleeve toward the plurality of locking balls.

4. The hand tool of claim 3, wherein the control sleeve is movable relative to the connector between a first position where the control sleeve presses the plurality of locking balls into the fixing groove of the drive member to lock the drive member onto the connector and a second position where the control sleeve is detached from the plurality of locking balls to release the plurality of locking balls from the fixing groove of the drive member to unlock the drive member from the connector.

5. The hand tool of claim 3, wherein the control sleeve has an inner wall that is movable to press or release the plurality of locking balls;

the connector has a mediate portion provided with a stepped abutting flange located between the first end and the second end of the connector;

the inner wall of the control sleeve has a mediate portion provided with a stepped abutting shoulder; and the elastic member is mounted on the second end of the connector and has a first end resting on the abutting flange of the connector and a second end resting on the abutting shoulder of the control sleeve.

6. The hand tool of claim 5, wherein the first end of the connector has a size greater than that of the second end of the connector.

7. The hand tool of claim 5, wherein when the control sleeve is movable toward the handle, the inner wall of the control sleeve is movable to release the plurality of locking balls, and the thrust member is pushed outwardly by a resorting force of the restoring member to push the fixing portion of the drive member outwardly relative to the connector.

8. The hand tool of claim 2, wherein the control sleeve is limited between the stop ring of the connector and the handle.

9. The hand tool of claim 1, further comprising:

a driving tip removably mounted on a second end of the drive member.

10. The hand tool of claim 1, wherein the thrust member has a mediate portion provided with an enlarged resting flange; and the restoring member is mounted on the thrust member and has a first end abutting the resting flange of the thrust member and a second end abutting a bottom wall of the receiving chamber of the handle.

11. The hand tool of claim 1, wherein the first end of the connector has an end face abutting the stop shoulder of the handle.

12. The hand tool of claim 1, wherein the inner thread of the handle has a size greater than that of the receiving chamber.

13. The hand tool of claim 1, wherein the thrust member has a substantially circular cross-sectional profile.

14. The hand tool of claim 1, wherein the thrust member is movable in the receiving chamber of the handle.

15. The hand tool of claim 1, wherein the push portion of the thrust member has a substantially hexagonal cross-sectional profile;

the mounting hole of the connector has a substantially hexagonal cross-sectional profile; and the fixing portion of the drive member has a substantially hexagonal cross-sectional profile.

16. The hand tool of claim 1, wherein the mounting hole of the connector extends through a whole length of the connector.

* * * * *